United States Patent
Zhou et al.

(10) Patent No.: US 12,069,195 B2
(45) Date of Patent: Aug. 20, 2024

(54) CURVED SCREEN ASSEMBLY AND TERMINAL

(71) Applicant: Honor Device Co., Ltd., Shenzhen (CN)

(72) Inventors: Guotong Zhou, Shenzhen (CN); Jianhong Luo, Shenzhen (CN); Shenghui Cao, Shenzhen (CN); Renwei Guo, Shenzhen (CN); Wei Zhang, Shenzhen (CN)

(73) Assignee: HONOR DEVICE CO., LTD., Guangdong (CN)

( * ) Notice: Subject to any disclaimer, the term of this patent is extended or adjusted under 35 U.S.C. 154(b) by 0 days.

(21) Appl. No.: 17/773,846

(22) PCT Filed: Mar. 23, 2021

(86) PCT No.: PCT/CN2021/082219
§ 371 (c)(1),
(2) Date: May 3, 2022

(87) PCT Pub. No.: WO2021/197116
PCT Pub. Date: Oct. 7, 2021

(65) Prior Publication Data
US 2022/0400169 A1   Dec. 15, 2022

(30) Foreign Application Priority Data
Apr. 1, 2020 (CN) .......................... 202020457460.8

(51) Int. Cl.
*H04M 1/02* (2006.01)

(52) U.S. Cl.
CPC ....... *H04M 1/0269* (2022.02); *H04M 1/0249* (2013.01)

(58) Field of Classification Search
CPC .... H04M 1/0269; H04M 1/0249; H04M 1/02; H04M 1/026; H04M 1/0266;
(Continued)

(56) References Cited

U.S. PATENT DOCUMENTS

| 10,324,493 B2 | 6/2019 | Kwak et al. |
| 2018/0241115 A1* | 8/2018 | Cho ..................... H05K 5/0017 |

(Continued)

FOREIGN PATENT DOCUMENTS

| CN | 106055027 A | 10/2016 |
| CN | 110035155 A * | 7/2019 |

(Continued)

*Primary Examiner* — Angelica Perez
(74) *Attorney, Agent, or Firm* — WOMBLE BOND DICKINSON (US) LLP (57) ABSTRACT

A curved screen assembly includes a curved display screen, a first supporting component and a middle frame. The curved display screen has a first arc-shaped face and a second arc-shaped face. The first supporting component is located between the middle frame and the first arc-shaped face, and first supporting component provided with a first supporting face. The first supporting face matches the first arc-shaped face in outline. The middle frame is provided with a second supporting face, wherein the second supporting face matches the second arc-shaped face in outline. In this application, the curved screen assembly and the terminal have a reasonable structural design and a more reliable overall structure.

16 Claims, 7 Drawing Sheets

(58) Field of Classification Search
CPC . H04M 1/0252; H04M 1/0254; G06F 1/1637; G06F 1/16; G06F 1/1601; G06F 1/1626; G06F 1/1633
See application file for complete search history.

(56) References Cited

U.S. PATENT DOCUMENTS

2020/0363838 A1* 11/2020 Kwak .................. G06F 1/1626
2022/0400169 A1   12/2022 Zhou et al.

FOREIGN PATENT DOCUMENTS

| CN | 110035155 A |   | 7/2019 |
|----|-------------|---|--------|
| CN | 110572492 A |   | 12/2019 |
| CN | 110648594 A | * | 1/2020 |
| CN | 110648594 A |   | 1/2020 |
| CN | 210075346 U |   | 2/2020 |
| CN | 212064060 U |   | 12/2020 |

* cited by examiner

CURVED SCREEN ASSEMBLY AND TERMINAL

CROSS-REFERENCE TO RELATED APPLICATIONS

This application is a National Stage of International Application No. PCT/CN2021/082219, filed on Mar. 23, 2021, which claims priority to Chinese Patent Application No. 202020457460.8, filed on Apr. 1, 2020. The disclosures of which are incorporated herein by reference in their entireties.

FIELD

This application relates to the field of display technologies, and in particular, to a curved screen assembly and a terminal.

BACKGROUND

At present, most touch display assembly products include a plane screen. With increasingly mature OLED (Organic Light-Emitting Diode, organic light-emitting diode) display technologies, curved display screen assemblies have become popular among users due to a better screen-to-body ratio. However, based on existing screen manufacturing processes, existing curved display screen assemblies are still in their early stage of development, having great development space and market prospects.

In view of the foregoing situation, this application provides a design structure of a curved screen.

SUMMARY

This application provides a curved screen assembly and a terminal. The curved screen assembly and the terminal have reasonable structural design and a more reliable overall structure.

One embodiment of this application provides a curved screen assembly, including:
 a curved display screen, a first supporting component, and a middle frame, where the curved display screen has a first arc-shaped face and a second arc-shaped face;
 the first supporting component is located between the middle frame and the first arc-shaped face, and provided with a first supporting face, where the first supporting face matches the first arc-shaped face in outline; and
 the middle frame is provided with a second supporting face, where the second supporting face matches the second arc-shaped face in outline.

In this application, with the design of the first supporting face and the second supporting face, the first arc-shaped face and the second arc-shaped face are well supported, which prevents each of the first arc-shaped face and the second arc-shaped face from forming a hollow space and being vulnerable to damage, effectively protecting the first arc-shaped face and the second arc-shaped face, and improving reliability of the curved screen assembly. In addition, the standalone first supporting component and the design structure with a second supporting face provided on the middle frame avoid the need to provide a supporting structural member on each side of the middle frame, effectively reducing errors in assembling the middle frame. Also, the manner to provide a detachable supporting structural member on one side optimizes the assembling process and improves assembling efficiency.

Further, the first supporting component includes:
 a supporting body, where the supporting body is provided with the first supporting face; and
 a connecting portion, where an end face of the supporting body facing the middle frame extends outward to form the connecting portion, and the connecting portion is connected to the middle frame in a detachable manner.

In this application, the connecting portion is connected to the middle frame in a detachable manner to facilitate maintenance and repair of components and parts. Further, the end face of the supporting body facing the middle frame extends outward to form the connecting portion, which means that the connecting portion protrudes from the end face of the supporting body. This exposed connection structure design facilitates observation and capture for assembling, and better facilitates the detachable connection between the middle frame and the connecting portion.

Further, the middle frame includes:
 a middle frame body, where the first supporting component is arranged between the middle frame body and the first arc-shaped face, and the connecting portion is connected to the middle frame body in a detachable manner; and
 a second supporting component, where the second supporting component is integrally molded with the middle frame body and provided with the second supporting face.

In this application, the second supporting component is integrally molded with the middle frame body, which can reduce errors in assembling the middle frame and simplify the assembling process by eliminating the need for subsequent assembling.

Further, the middle frame body is provided with a recess, and the recess limits and fits the connecting portion; where
 in a height direction of the middle frame, a depth of the recess is greater than or equal to a height of the connecting portion.

In this application, the middle frame body provided with the recess can better facilitate assembling the middle frame and facilitate position defining of the middle frame. The depth of the recess is greater than or equal to the height of the connecting portion, and the entire connecting portion is located in the recess after the middle frame is assembled with the connecting portion, preventing an end of the middle frame connected to the connecting portion from upwarping and affecting the support and protection effects of the second supporting face on the second arc-shaped face.

Further, the supporting body is connected to the middle frame body in a detachable manner.

In this application, this structural design can improve the firmness of connection between the middle frame and the first supporting component.

Further, the connecting portion is provided with a first screw hole and the supporting body is provided with a second screw hole.

In this application, a screw fastening method can guarantee the firmness of connections among components and parts.

Further, an axis of the first screw hole is arranged along a height direction of the middle frame; and
 an axis of the second screw hole is arranged along a width direction of the middle frame.

In this application, this structural design facilitates assembling of screws, reduces difficulty of making the screw holes, and improves assembling efficiency.

Further, the first supporting component further includes a position defining portion, and the supporting body is provided with the position defining portion; and the middle frame body is provided with a fitting portion, and the fitting portion limits and fits the position defining portion.

In this application, when the middle frame is being assembled, the position defining portion is used to define a position and size for assembling the middle frame with the first supporting component. After the fitting portion fits the position defining portion, assembling of the middle frame can be stopped to guarantee that the middle frame will not squeeze the curved display screen, reducing a damage rate, and to prevent damage to the curved display screen due to excessive assembling of the middle frame in the assembling process.

Further, the end face of the supporting body facing the middle frame extends outward to form a boss, and the end face of the supporting body facing the middle frame and the boss together form the position defining portion; and an end face of the middle frame body facing the boss extends outward to form the fitting portion.

In this application, with this design structure, the position defining portion is a stepped structure, and better facilitates the position defining operation. When the middle frame is being assembled, due to the position defining portion with the stepped structural design, the middle frame body cannot move further toward the direction of the curved display screen after the fitting portion fully fits onto a step face of the position defining portion, and preventing the middle frame from squeezing the curved display screen.

Further, the end face of the supporting body facing the middle frame and an end face of the boss facing the middle frame are both a first tilted face;

the end face of the middle frame body facing the boss and an end face of the fitting portion facing the boss are both a second tilted face; and the first tilted face is parallel to the second tilted face.

In this application, the first tilted face fits the second tilted face to improve frictional resistance between the first supporting component and the middle frame, preventing motion of the first supporting component relative to the middle frame. In addition, the first tilted face and the second tilted face are designed in such a way that even if the first supporting face does not fit completely with the first arc-shaped face after the first supporting component is assembled, the first supporting face can completely fit with the first arc-shaped face under the action of the middle frame when the middle frame is assembled.

The curved display screen assembly further includes:

a cover plate, where the curved display screen fits onto a surface of the cover plate, and the curved display screen matches the cover plate in outline;

a housing, where the housing and the cover plate are connected to each other at the edge, and the housing and the cover plate enclose an accommodating chamber; and the curved display screen, the first supporting component and the middle frame are all located in the accommodating chamber.

In this application, this structural design, which enables the middle frame to be hidden in the accommodating chamber formed by the housing and the cover plate, makes the curved screen assembly integrated, and improving visual aesthetics of appearance. The hidden middle frame may be manufactured with a low-cost process because there is no need to consider an appearance effect, and reducing manufacturing costs of structural members of the device.

Further, the first supporting component and the second supporting component are both provided with a glue overflow groove; and joints between the housing and the cover plate are arranged opposite the glue overflow grooves.

In this application, the glue overflow grooves can collect excess glue at the joints between the housing and the cover plate, preventing glue at the joints between the housing and the cover plate from flowing to the curved display screen and leading to abnormal display of the screen.

In another embodiment of this application provides a terminal, where the terminal includes a body and the curved screen assembly described above; where the curved screen assembly is connected to the body.

In this application, the terminal has the same advantages as the curved screen assembly described above, which have been clearly described above, and will not be repeated herein.

It should be understood that the foregoing general description and the following detailed description are only examples and are not intended to limit this application.

REFERENCE SIGNS 1. curved display screen;
    11. first arc-shaped face;
    12. second arc-shaped face;
2. first supporting component;
    21. supporting body;
        211. first supporting face;
        212. second screw hole;
        213. first tilted face;
    22. connecting portion;
        221. first screw hole;

23. position defining portion;
24. boss;
25. glue overflow groove;
3. middle frame;
   31. middle frame body;
      311. recess;
      312. fitting portion;
      313. second tilted face;
   32. second supporting component;
      321. second supporting face;
4. cover plate; and
5. housing.

The accompanying drawings herein are incorporated into this specification and form a part of this specification, illustrate the embodiments conforming to this application, and are intended to explain the principles of this application together with this specification.

DESCRIPTION OF EMBODIMENTS

Terms in the embodiments of this application are merely intended to describe some embodiments of this application, and are not intended to limit this application.

Electronic terminals such as mobile phones, tablet computers, and intelligent wearable devices have become indispensable objects nowadays. They enrich life and improve life quality. In the era of rapid development of science and technology, people not only require electronic terminals to have good performance, but also put forward high requirements for appearance of electronic terminals. Taking mobile phones as an example, from keypad mobile phones to touch-screen mobile phones, to large size mobile phones and today's most popular "full-screen" mobile phones, user experience is always a consideration.

To further improve user experience, a curved display screen 1 comes up in the prior art. The curved display screen 1 has an arc-shaped portion, effectively increasing a display area, improving a screen-to-body ratio of an electronic terminal, and better meeting people's visual demands.

Figure 1:
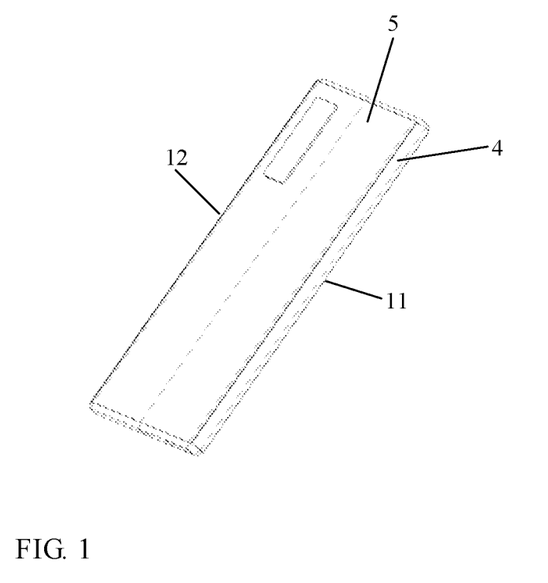
FIG. 1 is a schematic structural diagram of a curved screen assembly according to an embodiment of this utility model.

With increasingly mature curved display screen 1 technologies, curved display screens 1 have developed from those with small bending angle at the beginning to "waterfall screens" with a bending angle of nearly 90°. Some existing curved display screens 1 even have a bending angle of more than 90°. However, as shown in FIG. 1, when a curved display screen 1 and a housing 5 are being assembled, the arc-shaped portion will be retracted because the curved display screen 1 has a bending angle greater than 90°, and leading to a hollow space at the location of the arc-shaped portion without any support and protection, and resulting in that the curved display screen 1 is vulnerable to damage, less reliable, or other problems.

Figure 2:
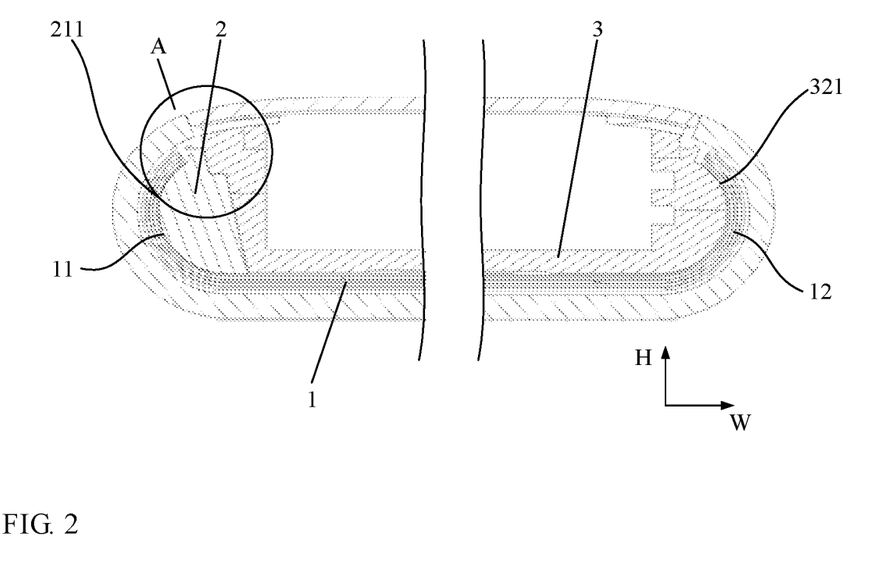
FIG. 2 is a cut-away view of a curved screen assembly according to an embodiment of this utility model.

To guarantee reliability of the curved display screen 1, as shown in FIG. 2, this embodiment provides a curved screen assembly. The curved screen assembly includes a curved display screen 1, a first supporting component 2 and a middle frame 3, where the first supporting component 2 and the middle frame 3 are both located at the inner surface of the curved display screen 1.

The curved display screen 1 has a first arc-shaped face 11 and a second arc-shaped face 12. In one embodiment, the first supporting component 2 is located between the middle frame 3 and the first arc-shaped face 11, and the first supporting component 2 is provided with a first supporting face 211, where the first supporting face 211 matches the first arc-shaped face 11 in outline. The middle frame 3 is provided with a second supporting face 321, where the second supporting face 321 matches the second arc-shaped face 12 in outline.

With the design of the first supporting face 211 and the second supporting face 321, the first arc-shaped face 11 and the second arc-shaped face 12 are well supported, which means that the location at which the retraction of the curved display screen 1 occurs in assembling is supported. This prevents each of the first arc-shaped face 11 and the second arc-shaped face 12 from forming a hollow space and being vulnerable to damage, effectively protecting the first arc-shaped face 11 and the second arc-shaped face 12, and improving reliability of the curved screen assembly.

In the assembly of the curved display screen 1, when the first supporting component 2, the middle frame 3, and the curved display screen 1 are assembled, the standalone first supporting component 2 and the design structure with a second supporting face 321 provided on the middle frame 3 avoid the need to provide a supporting structural member on each side of the middle frame 3, in order to support the first arc-shaped face 11 and the second arc-shaped face 12, effectively reducing errors in assembling the middle frame 3, and better guaranteeing stability of the middle frame 3 after assembling. Also, the manner to provide a detachable supporting structural member on one side optimizes the assembling process and improves assembling efficiency.

The first supporting component 2 may be directly disposed between the first arc-shaped face 11 and the middle frame 3, and in dependence on dimensional fits between the components and parts, the curved display screen 1, the first supporting component 2 and the middle frame 3 are assembled. Alternatively, to guarantee the firmness of connection between the first supporting component 2 and the middle frame 3, the first supporting component 2 may also be connected to the middle frame 3 by bonding, welding, or the like. To facilitate maintenance and repair of components and parts, this embodiment provides a method for connecting the first supporting component 2 to the middle frame 3, where the first supporting component 2 is connected to the middle frame 3 in a detachable manner. A detachable connection method may include screw fastening, clamping, or the like.

Figure 3:
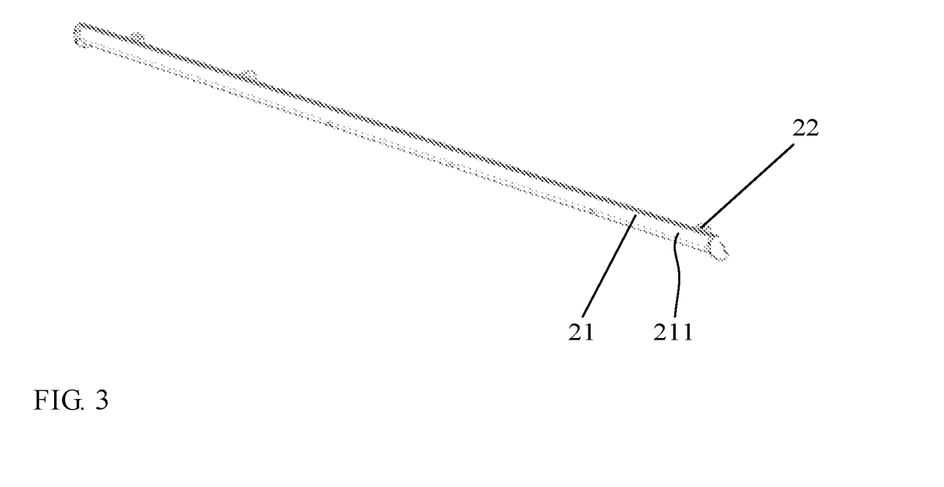
FIG. 3 is a schematic structural diagram of a first supporting component in a curved screen assembly according to an embodiment of this utility model.

As shown in FIG. 3, in this embodiment, the first supporting component 2 includes a supporting body 21 provided with the first supporting face 211. The supporting body 21 is located between the first arc-shaped face 11 and a middle frame body 31. An end face of the supporting body 21 facing the middle frame 3 extends outward to form a connecting portion 22, and the connecting portion 22 is connected to the middle frame 3 in a detachable manner. Further, the end face of the supporting body 21 facing the middle frame 3 extends outward to form the connecting portion 22, which means that the connecting portion 22 protrudes from the end face of the supporting body 21. This exposed connection structure design facilitates observation and capture for assembling, and better facilitates the detachable connection between the middle frame 3 and the connecting portion 22. In addition, this structural design forms the integrated first supporting component 2, improving structural strength of the connecting portion 22 and facilitating processing of the first supporting component 2.

Figure 4:
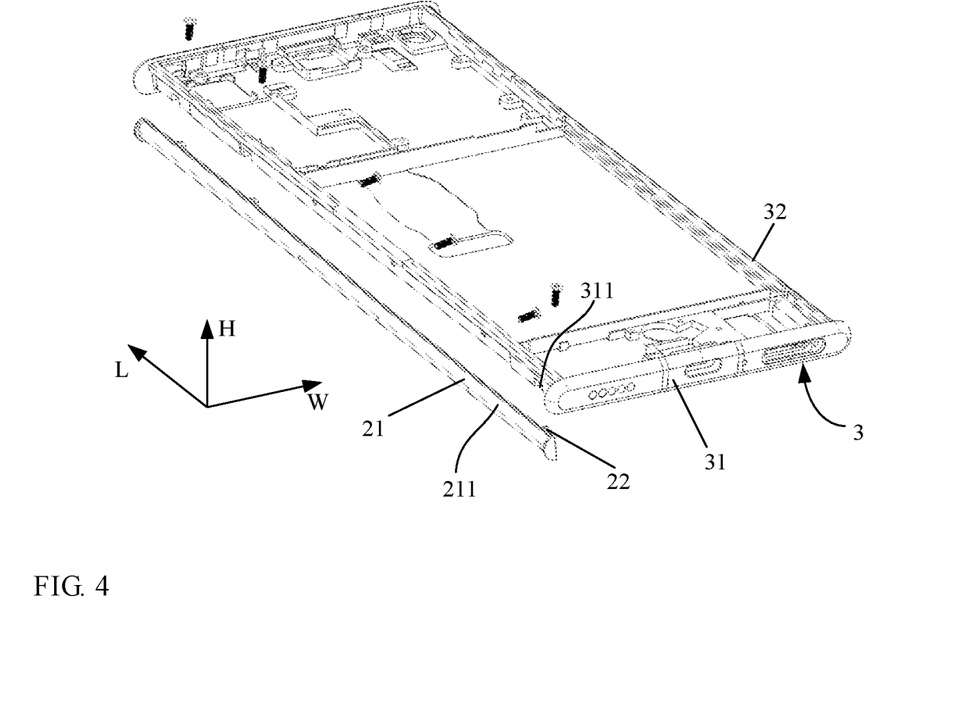
FIG. 4 is an exploded view of a first supporting component and a middle frame in a curved screen assembly according to an embodiment of this utility model.

As shown in FIG. 4, in this embodiment, the middle frame 3 includes the middle frame body 31 and a second supporting component 32. To reduce errors in assembling the middle frame 3, the second supporting component 32 is integrally molded with the middle frame body 31, and the integrated structural design facilitates processing of the middle frame 3 and simplifies the assembling process by eliminating the need for subsequent assembling.

Referring to FIG. 4 again, in this embodiment, to better facilitate the assembling of the middle frame 3, the middle frame body 31 is provided with a recess 311, and the recess 311 limits and fits the connecting portion 22. Design of the recess 311 facilitates position defining of the middle frame 3. Further, in a height direction H of the middle frame 3, a depth of the recess 311 may be less than a height of the connecting portion 22. To prevent an end of the middle frame 3 connected to the connecting portion 22 from upwarping and affecting the support and protection effects of the second supporting face 321 on the second arc-shaped face 12, the depth of the recess 311 is greater than or equal to the height of the connecting portion 22, and the entire connecting portion 22 is located in the recess 311 after the middle frame 3 is assembled with the connecting portion 22. In addition, for the recess 311 with a greater depth, in design of the middle frame 3, there is no need to consider influence of the height of the connecting portion 22.

Further, to improve the firmness of connection between the middle frame 3 and the first supporting component 2, the supporting body 21 is connected to the middle frame body 31 in a detachable manner, and the supporting body 21 may be connected to the middle frame body 31 by means of screw fastening, clamping, or the like.

Figure 5:
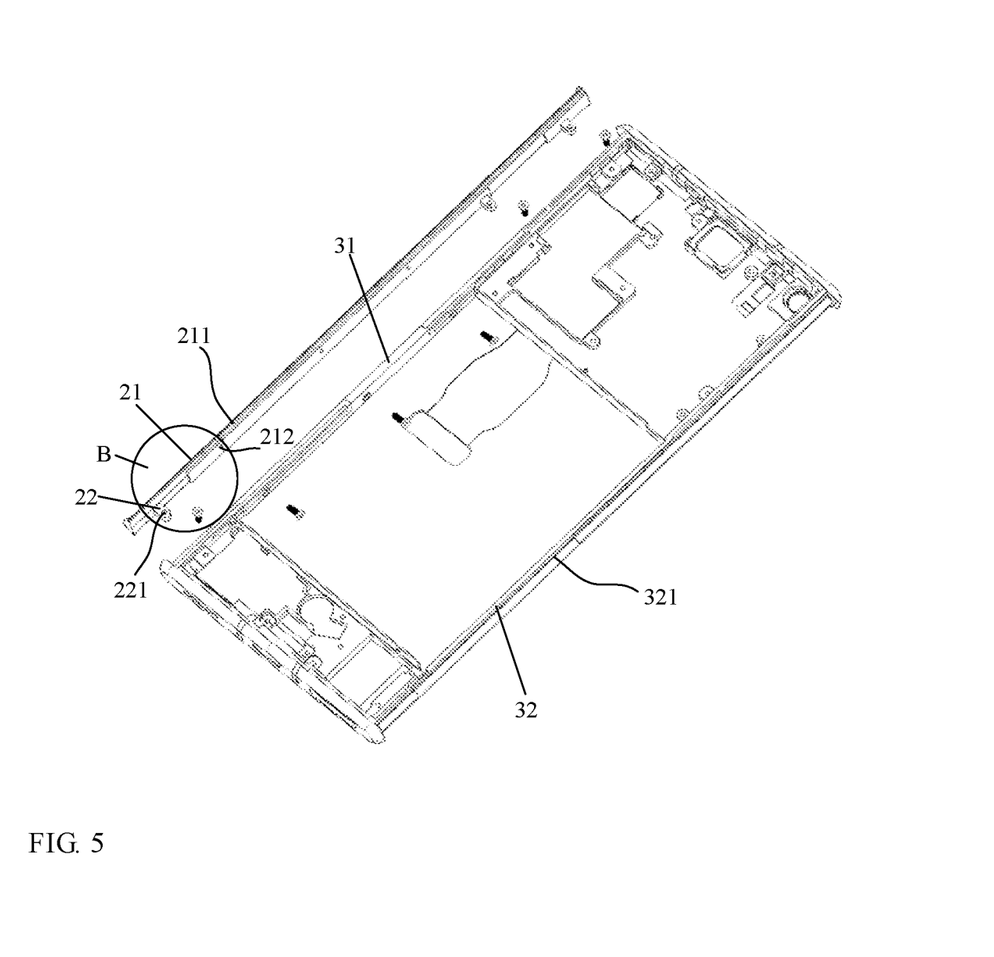
FIG. 5 is an exploded view of a first supporting component and a middle frame in a curved screen assembly according to an embodiment of this utility model when viewed in another direction.
Figure 6:
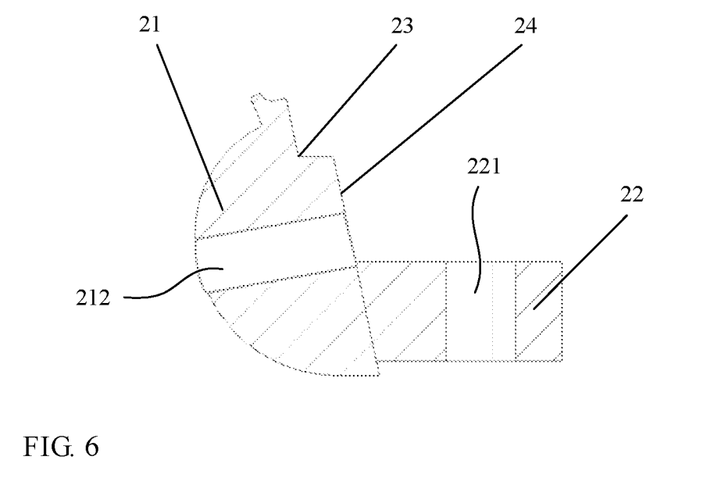
FIG. 6 is a cut-away view of a first supporting component in a curved screen assembly according to an embodiment of this utility model.

As shown in FIG. 5 and FIG. 6, in this embodiment, the supporting body 21 and the connecting portion 22 may both be connected to the middle frame body 31 by means of screw fastening. The screw fastening can guarantee the firmness of connections among components and parts. In one embodiment, the connecting portion 22 is provided with a first screw hole 221, and the supporting body 21 is provided with a second screw hole 212. The screw holes may be opened in directions in the supporting body 21 and the connecting portion 22. To facilitate assembling of screws and reduce difficulty of making the screw holes, an axis of the first screw hole 221 is arranged along a height direction H of the middle frame 3, and an axis of the second screw hole 212 is arranged along a width direction W of the middle frame 3. This method also facilitates screw-in of screws when the middle frame 3 is being fastened, improving assembling efficiency.

Figure 7:
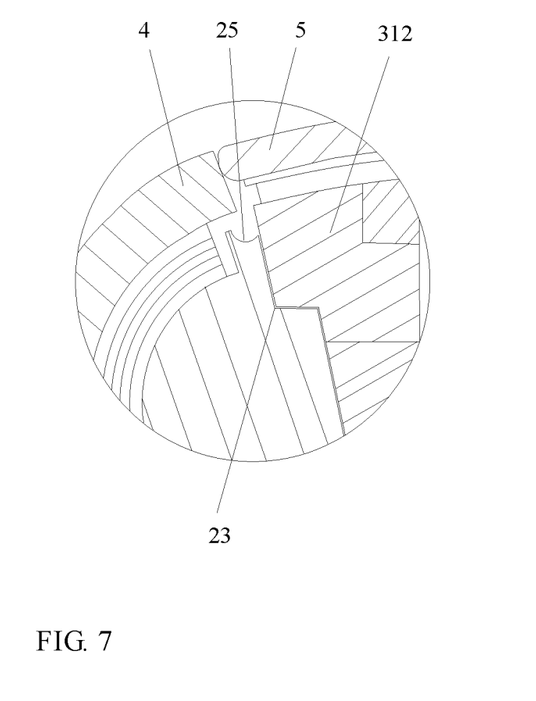
FIG. 7 is an enlarged view of position A in FIG. 2.

To prevent excessive assembling of the middle frame 3 in the assembling process and prevent damage and caused to the curved display screen 1, as shown in FIG. 7, in this embodiment, the first supporting component 2 further includes a position defining portion 23, and the supporting body 21 is provided with the position defining portion 23. The middle frame body 31 is provided with a fitting portion 312, and the fitting portion 312 limits and fits the position defining portion 23. When the middle frame 3 is being assembled, the position defining portion 23 is used to define a position and size for assembling the middle frame 3 with the first supporting component 2. After the fitting portion 312 fits the position defining portion 23, assembling of the middle frame 3 may be stopped to guarantee that the middle frame 3 will not squeeze the curved display screen 1, reducing a damage rate.

Figure 8:
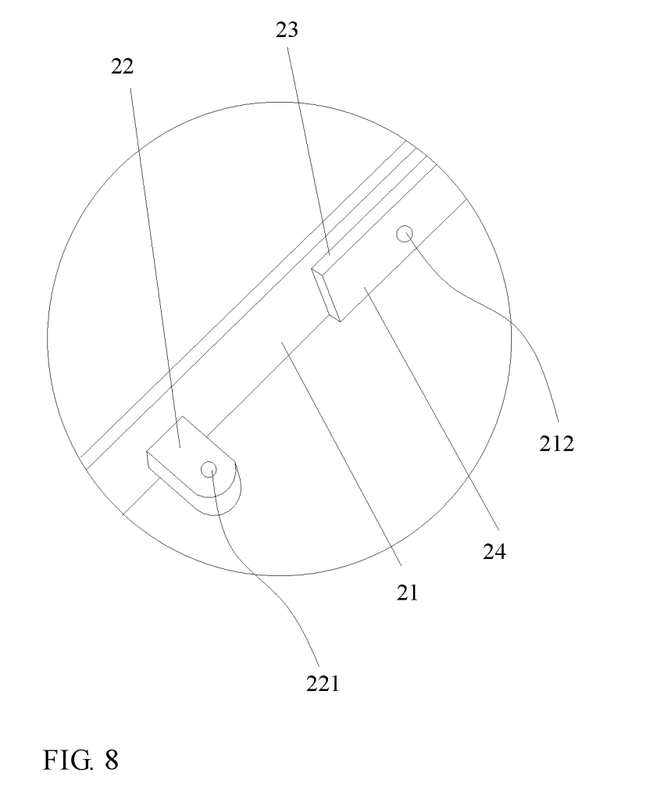
FIG. 8 is an enlarged view of position B in FIG. 5.

The position defining portion 23 has design structures. For example, the position defining portion 23 may be a magnetic component, the middle frame body 31 is provided with another magnetic component or an iron plate, and in assembling of the middle frame 3, when the position defining portion 23 completely and magnetically mates with the fitting portion 312, the assembling is in place; or, the position defining portion 23 and the fitting portion 312 are both raised structures, and when the position defining portion 23 is aligned with the fitting portion 312 in height, the assembling is in place. To better facilitate position defining, as shown in FIG. 8, this embodiment provides a design structure of the position defining portion 23 and the fitting portion 312. In one embodiment, the end face of the supporting body 21 facing the middle frame 3 extends outward to form a boss 24, and the end face of the supporting body 21 facing the middle frame 3 and the boss 24 together form the position defining portion 23, and the position defining portion 23 is a stepped structure. An end face of the middle frame body 31 facing the boss 24 extends outward to form the fitting portion 312. When the middle frame 3 is being assembled, due to the position defining portion 23 with the stepped structural design, the middle frame body 31 cannot move further toward the direction of the curved display screen 1 after the fitting portion 312 fully fits onto a step face of the position defining portion 23, and preventing the middle frame 3 from squeezing the curved display screen 1.

Figure 9:
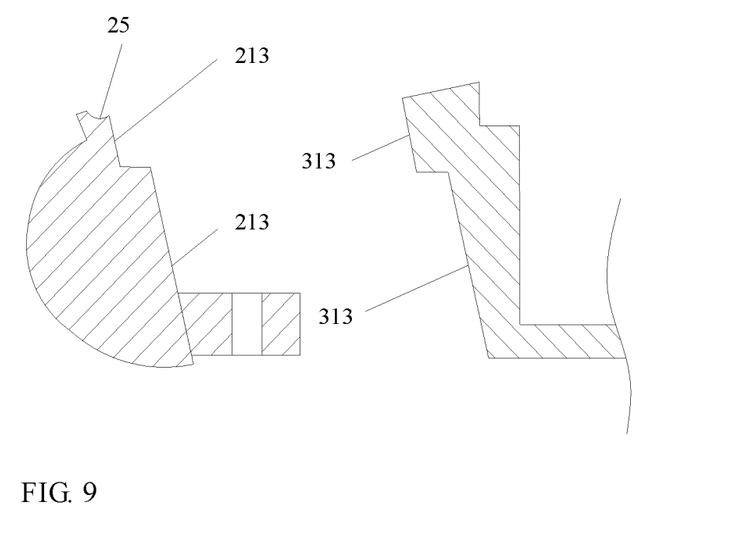
FIG. 9 is a schematic structural diagram of a first tilted face and a second tilted face in a curved screen assembly according to an embodiment of this utility model.

In the height direction H of the middle frame 3, the end face of the supporting body 21 facing the middle frame body 31 and an end face of the boss 24 facing the middle frame body 31 may both be a vertical plane. As shown in FIG. 9, in this embodiment, to improve assembling efficiency and reduce assembling difficulty, the end face of the supporting body 21 facing the middle frame 3 and the end face of the boss 24 facing the middle frame 3 are both a first tilted face 213. The first tilted face 213 is designed in such a way that, even if the first supporting face 211 does not completely fit with the first arc-shaped face 11 after the first supporting component 2 is assembled, the first supporting face 211 may completely fit with the first arc-shaped face 11 under the action of the middle frame 3 when the middle frame 3 is assembled. Further, to improve stability of pre-assembling of the middle frame 3 with the first supporting component 2 and facilitate a next screw fastening procedure, the end face of the middle frame body 31 facing the boss 24 and an end face of the fitting portion 312 facing the boss 24 are both a second tilted face 313, and the first tilted face 213 is parallel to the second tilted face 313. The first tilted face 213 fits the second tilted face 313 to improve frictional resistance between the first supporting component 2 and the middle frame 3, preventing motion of the first supporting component 2 relative to the middle frame 3. In one embodiment, compared with vertical faces, tilted faces has lower design process requirements, and can achieve stable assembling of the first supporting component 2 with the middle frame 3 without guaranteeing full fitting between contact faces.

Figure 10:
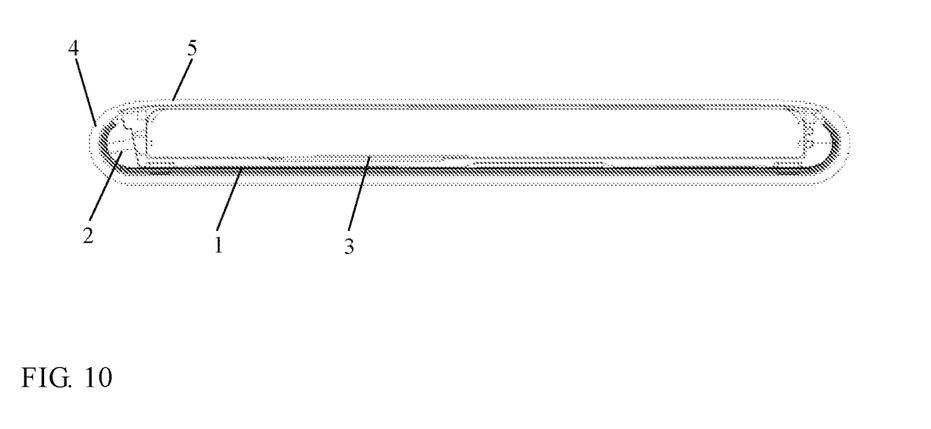
FIG. 10 is an internal schematic structural diagram of a curved screen assembly according to an embodiment of this utility model.

As shown in FIG. 10, in this embodiment, the curved screen assembly further includes a cover plate 4 and a housing 5. The curved display screen 1 fits onto a surface of the cover plate 4, and the curved display screen 1 matches the cover plate 4 in outline. The housing 5 and the cover plate 4 are connected to each other at the edge, and the housing 5 and the cover plate 4 enclose an accommodating chamber. The curved display screen 1, the first supporting component 2, and the middle frame 3 are all located in the accommodating chamber. This structural design, which enables the middle frame 3 to be hidden in the accommodating chamber formed by the housing 5 and the cover plate 4, makes the curved screen assembly integrated, and improving visual aesthetics of appearance.

The middle frame 3 is provided with a glue layer or a glue dispensing space to stick the housing 5. The housing 5 may fit onto the middle frame 3 by using the glue layer. Further, joints between the cover plate 4 and the housing 5 are arranged to transit smoothly. The joints at edges of the cover plate 4 and the housing 5 may be filled with embedded threads by using a process such as external caulking glue, to reduce seams in appearance of the curved screen assembly, improving the appearance of the curved screen assembly.

In addition, in processing technology of the middle frame 3, the hidden middle frame 3 may be completely manufactured with a low-cost process, such as aluminum die casting, because there is no need to consider an appearance effect, and reducing manufacturing costs of structural members of the device. A hidden design of the middle frame 3 can also simplify assembling procedures and improve assembling efficiency.

Figure 11:
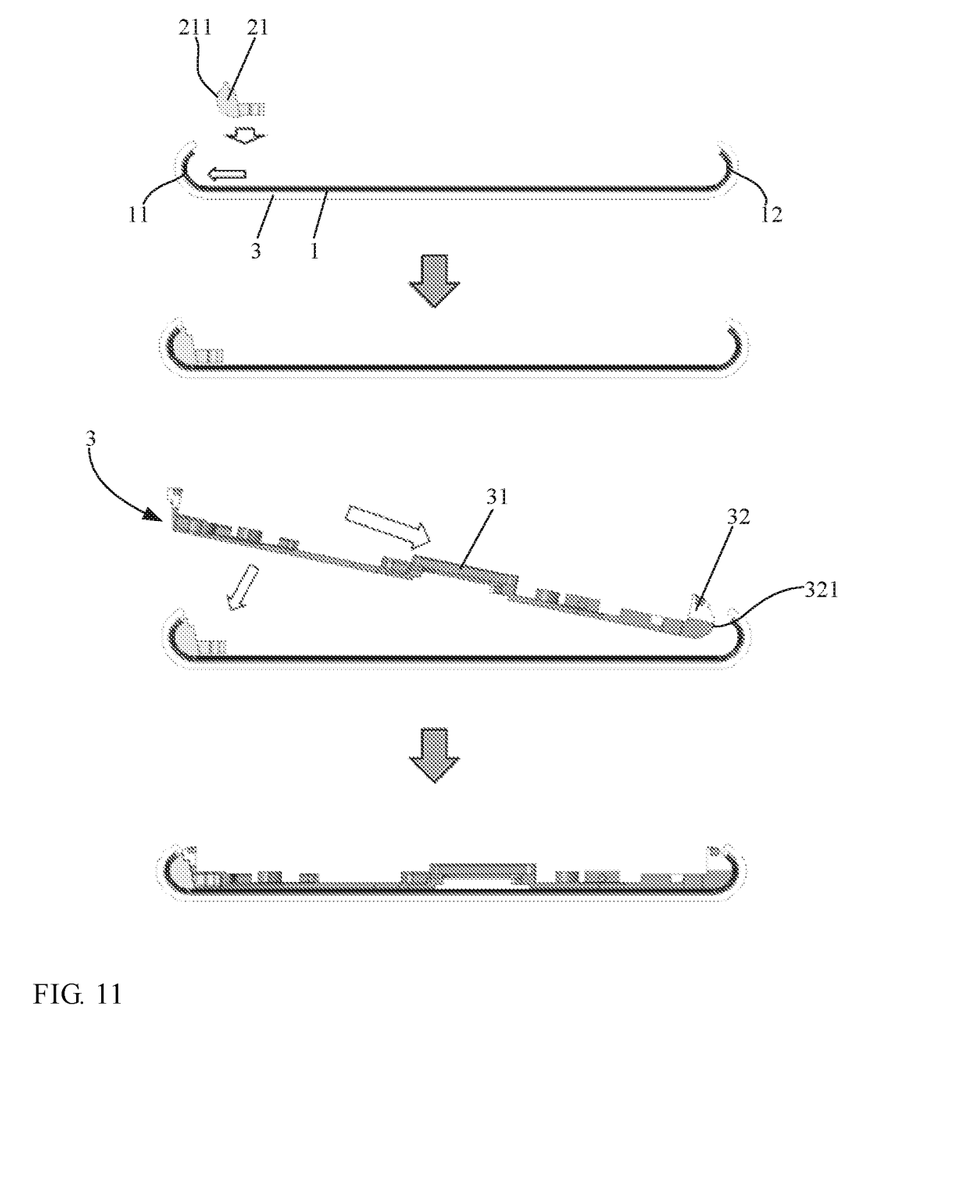
FIG. 11 is an assembling flowchart of a curved screen assembly according to an embodiment of this utility model.

As shown in FIG. 11, in this embodiment, a method for assembling the curved screen assembly is as follows:

S01: Assemble the cover plate 4 with the curved display screen 1 first.

S03: Use a fixture to pre-fasten the first supporting component 2 to the first arc-shaped face 11 by using foam tape or any other flexible binding material.

S05: Obliquely put in the middle frame 3, and the second supporting face 321 fully fits onto the second arc-shaped face 12, and lay the middle frame 3 flat after the middle frame 3 is in place, and the middle frame 3 fits the pre-fastened first supporting component 2.

S07: Tighten screws to finally fasten the middle frame 3 to the first supporting component 2.

S09: Cover the housing 5 with the cover plate 4, and connect the housing 5 and the cover plate 4 by glue at the joint.

The foregoing connection methods may be separately used or combined according to an actual internal space of the curved display screen 1 assembly. In addition to the foregoing connection methods, any other method for fastening components and parts may be used as long as requirements for fastening components and parts are met.

As shown in FIG. 7 and FIG. 9, in this embodiment, the first supporting component 2 and the second supporting component 32 are both provided with a glue overflow groove 25. Joints between the housing 5 and the cover plate 4 are arranged opposite the glue overflow grooves 25. The glue overflow grooves 25 can collect excess glue at the joints between the housing 5 and the cover plate 4, preventing glue at the joints between the housing 5 and the cover plate 4 from flowing to the curved display screen 1 and leading to abnormal display of the screen.

This embodiment provides a terminal. The terminal includes the curved screen assembly according to any one of the foregoing embodiments. The terminal may be a mobile phone, a tablet computer, an intelligent wearable device, or the like.

In this embodiment, the terminal includes but is not limited to an apparatus that is configured to receive/transmit communication signals through a wired line connection, for example, through a public switched telephone network (PSTN, Public Switched Telephone Network), a digital subscriber line (DSL, Digital Subscriber Line), a digital cable, a direct cable connection, and/or through a wireless interface for a cellular network, a wireless local area network (WLAN, Wireless Local Area Network), a digital television network such as a DVB-H network, a satellite network, an AM-FM broadcast transmitter, and/or another terminal.

The terminal configured to communicate through a wireless interface may be referred to as a "wireless communication terminal", a "wireless terminal" or a "mobile terminal". Examples of the mobile terminal include but are not limited to a satellite or a cellular telephone; a personal communication system terminal capable of combining a cellular radio telephone and data processing, faxing and data communication capabilities; and a conventional laptop and/or palmtop receiver or another electronic apparatus including a radio telephone transceiver.

The foregoing descriptions are merely some embodiments of this application, but are not intended to limit this application. This application may have various modifications and variations. Any modification, equivalent replacement, or improvement made may fall within the protection scope of this application.

What is claimed is:

1. A curved screen assembly, comprising:
a curved display screen with a first arc-shaped face and a second arc-shaped face;
a first supporting component; and
a middle frame comprising a middle frame body and comprising a second supporting component that is integrally molded with the middle frame body and that is provided with a second supporting face;
wherein the first supporting component is located between the middle frame body and the first arc-shaped face, and the first supporting component is provided with a first supporting face, wherein the first supporting face matches the first arc-shaped face in outline and wherein the first supporting component comprises a supporting body that extends outward at an end face of the supporting body that faces the middle frame to form a connecting portion that is connected to the middle frame body in a detachable manner; and
wherein the second supporting face matches the second arc-shaped face in outline.

2. The curved screen assembly according to claim 1, wherein the middle frame body is provided with a recess, and the recess limits and fits the connecting portion;
wherein, in a height direction of the middle frame, a depth of the recess is greater than or equal to a height of the connecting portion.

3. The curved screen assembly according to claim 1, wherein the supporting body is connected to the middle frame body in a detachable manner.

4. The curved screen assembly according to claim 3, wherein the connecting portion is provided with a first screw hole and the supporting body is provided with a second screw hole.

5. The curved screen assembly according to claim 4, wherein an axis of the first screw hole is arranged along a height direction of the middle frame; and
an axis of the second screw hole is arranged along a width direction of the middle frame.

6. The curved screen assembly according to claim 1, wherein the first supporting component further comprises a position defining portion, and the supporting body is provided with the position defining portion; and
wherein the middle frame body is provided with a fitting portion, and the fitting portion limits and fits the position defining portion.

7. The curved screen assembly according to claim 6, wherein the end face of the supporting body facing the middle frame extends outward to form a boss, and the end face of the supporting body facing the middle frame and the boss together form the position defining portion; and
wherein an end face of the middle frame body facing the boss extends outward to form the fitting portion.

8. The curved screen assembly according to claim 7, wherein the end face of the supporting body facing the middle frame and an end face of the boss facing the middle frame are both a first tilted face;

wherein the end face of the middle frame body facing the boss and an end face of the fitting portion facing the boss are both a second tilted face; and wherein the first tilted face is parallel to the second tilted face.

9. The curved screen assembly according to claim 7, further comprising:

a cover plate, wherein the curved display screen fits onto a surface of the cover plate, and the curved display screen matches the cover plate in outline;

a housing, wherein the housing and the cover plate are connected to each other at an edge, so that the housing and the cover plate enclose an accommodating chamber; and wherein the curved display screen, the first supporting component, and the middle frame are all located in the accommodating chamber.

10. The curved screen assembly according to claim 9, wherein the first supporting component and the second supporting component are both provided with a glue overflow groove; and wherein joints between the housing and the cover plate are arranged opposite the glue overflow grooves.

11. A terminal, comprising a main body; and a curved screen assembly that is connected to the main body, the curved screen assembly comprising:

a curved display screen with a first arc-shaped face and a second arc-shaped face;

a first supporting component; and a middle frame comprising a middle frame body and comprising a second supporting component that is integrally molded with the middle frame body and that is provided with a second supporting face;

wherein the first supporting component is located between the middle frame body and the first arc-shaped face, and the first supporting component is provided with a first supporting face, wherein the first supporting face matches the first arc-shaped face in outline and wherein the first supporting component comprises a supporting body that extends outward at an end face of the supporting body that faces the middle frame to form a connecting portion that is connected to the middle frame body in a detachable manner; and wherein the second supporting face matches the second arc-shaped face in outline.

12. The terminal according to claim 11, wherein the middle frame body is provided with a recess, and the recess limits and fits the connecting portion;

wherein, in a height direction of the middle frame, a depth of the recess is greater than or equal to a height of the connecting portion.

13. The terminal according to claim 11, wherein the supporting body is connected to the middle frame body in a detachable manner.

14. The terminal according to claim 13, wherein the connecting portion is provided with a first screw hole and the supporting body is provided with a second screw hole.

15. The terminal according to claim 14, wherein an axis of the first screw hole is arranged along a height direction of the middle frame; and an axis of the second screw hole is arranged along a width direction of the middle frame.

16. The terminal according to claim 11, wherein the first supporting component further comprises a position defining portion, and the supporting body is provided with the position defining portion; and wherein the middle frame body is provided with a fitting portion, and the fitting portion limits and fits the position defining portion.

* * * * *